United States Patent
Kar et al.

(10) Patent No.: US 11,308,523 B2
(45) Date of Patent: Apr. 19, 2022

(54) VALIDATING A TARGET AUDIENCE USING A COMBINATION OF CLASSIFICATION ALGORITHMS

(71) Applicant: Adobe Inc., San Jose, CA (US)

(72) Inventors: Wreetabrata Kar, West Lafayette, IN (US); Viswanathan Swaminathan, Saratoga, CA (US); Sarathkrishna Swaminathan, Salt Lake City, UT (US)

(73) Assignee: Adobe Inc., San Jose, CA (US)

( * ) Notice: Subject to any disclaimer, the term of this patent is extended or adjusted under 35 U.S.C. 154(b) by 1002 days.

(21) Appl. No.: 15/457,882

(22) Filed: Mar. 13, 2017

(65) Prior Publication Data

US 2018/0260857 A1 Sep. 13, 2018

(51) Int. Cl.
*G06Q 30/00* (2012.01)
*G06Q 30/02* (2012.01)
(Continued)

(52) U.S. Cl.
CPC ..... *G06Q 30/0271* (2013.01); *G06Q 30/0254* (2013.01); *G06Q 30/0255* (2013.01);
(Continued)

(58) Field of Classification Search
None
See application file for complete search history.

(56) References Cited

U.S. PATENT DOCUMENTS 5,991,735 A * 11/1999 Gerace ............... G06Q 30/02
705/7.29

8,494,897 B1 * 7/2013 Dawson ............. G06Q 30/02
705/14.42

(Continued)

FOREIGN PATENT DOCUMENTS

| EP | 1895463 A1 * | 3/2008 | ............. G06Q 30/02 |
| EP | 3136332 A1 * | 3/2017 | ............. G06F 16/23 |
| WO | WO-2014127301 A2 * | 8/2014 | ............... G06N 5/02 |

OTHER PUBLICATIONS

Kar, Wreetabrata, Sarathkrishna Swaminathan, and Viswanathan Swaminathan. "Audience Validation from Demographic Mix and Insufficient Individual Data." 2016 IEEE International Symposium on Multimedia (ISM). IEEE, 2016. (Year: 2016).*

(Continued)

*Primary Examiner* — Michael Bekerman
(74) *Attorney, Agent, or Firm* — Keller Preece PLLC

(57) ABSTRACT

This disclosure generally covers systems and methods that determine demographic labels for a user or a group of users by using digital inputs within a predictive model for demographic classification. In particular, the disclosed systems and methods use a unique combination of classification algorithms to determine demographic labels for users as a potential audience of digital content items. When applying the combination of classification algorithms, the disclosed systems and methods use a first classification algorithm to determine user-level-latent features for each user within a group of users based on demographic-label statistics associated with particular digital content items. The disclosed systems and methods then use the user-level-latent features and session-level features (from sessions of each user consuming the digital content items) as inputs in a second classification algorithm to determine a demographic label for each user within the group of users.

20 Claims, 8 Drawing Sheets

(51) Int. Cl.
*H04N 21/258* (2011.01)
*G06F 16/435* (2019.01)
*G06F 16/635* (2019.01)
*H04N 21/81* (2011.01)

(52) U.S. Cl.
CPC .......... *G06F 16/435* (2019.01); *G06F 16/635* (2019.01); *H04N 21/25883* (2013.01); *H04N 21/812* (2013.01)

(56) References Cited

U.S. PATENT DOCUMENTS

| | | | | |
|---|---|---|---|---|
| 9,003,441 | B1* | 4/2015 | Jindal | H04N 21/44222 725/35 |
| 2003/0101024 | A1* | 5/2003 | Adar | G06Q 30/02 702/187 |
| 2007/0208728 | A1* | 9/2007 | Zhang | G06F 16/337 |
| 2010/0082360 | A1* | 4/2010 | Chien | G06Q 30/02 705/14.53 |
| 2010/0203876 | A1* | 8/2010 | Krishnaswamy | G06Q 30/02 455/418 |
| 2013/0138506 | A1* | 5/2013 | Zhu | G06Q 30/0241 705/14.53 |
| 2014/0108130 | A1* | 4/2014 | Vos | G06Q 30/0246 705/14.45 |
| 2015/0112812 | A1* | 4/2015 | Weinsberg | G06Q 30/0269 705/14.66 |
| 2015/0339687 | A1* | 11/2015 | Ioannidis | G06Q 30/0241 705/7.33 |
| 2015/0348083 | A1* | 12/2015 | Brill | G06Q 30/0222 705/14.23 |
| 2015/0356581 | A1* | 12/2015 | Litmanovich | H04L 67/22 705/7.33 |
| 2016/0086222 | A1* | 3/2016 | Kurapati | G06Q 30/0204 705/14.53 |
| 2018/0082325 | A1* | 3/2018 | Kitts | G06Q 30/0242 |
| 2018/0144256 | A1* | 5/2018 | Saxena | G06N 20/00 |
| 2018/0204230 | A1* | 7/2018 | Cai | G06N 20/10 |

OTHER PUBLICATIONS

"Digital ad spending to surpass tv next year," http://www.emarketer.com/Article/Digital-Ad-Spending-Surpass-TV-Next-Year/1013671, accessed: Mar. 16, 2016.

J. Yan, N. Liu, G. Wang, W. Zhang, Y. Jiang, and Z. Chen, "How much can behavioral targeting help online advertising?" in Proceedings of the 18th international conference on World wide web. ACM, 2009, pp. 261-270.

M. H. Williams, C. Perlich, B. Dalessandro, and F. Provost, "Pleasing the advertising oracle Probabilistic prediction from sampled, aggregated ground truth," in Proceedings of the Eighth International Workshop on Data Mining for Online Advertising, ser. ADKDD' 14. New York, NY, USA: ACM, 2014, pp. 3:1-3:9. [Online]. Available: http://doi.acm.org/10.1145/2648584.2648587.

P. Eckert, "Gender and sociolinguistic variation," Language and gender: A reader, pp. 64-75, 1998, abstract only.

A. Mulac and T. L. Lundell, "Effects of gender-linked language differences in adults' written discourse: Multivariate tests of language effects," Language & Communication, vol. 14, No. 3, pp. 299-309, 1994.

J. Schler, M. Koppel, S. Argamon, and J. Pennebaker, Effects of age and gender on blogging, 2006, vol. SS-06-03, pp. 191-197.

J. Hu, H.-J. Zeng, H. Li, C. Niu, and Z. Chen, "Demographic prediction based on user's browsing behavior," in Proceedings of the 16th International Conference on World Wide Web, ser. WWW '07. New York, NY, USA: ACM, 2007, pp. 151-160. [Online], Available: http://doi.acm.org/10.1145/1242572.1242594.

S. Goel, J. M. Hofman, and M. I. Sirer, "Who does what on the web: A large-scale study of browsing behavior," in Proceedings of the Sixth International Conference on Weblogs and Social Media, Dublin, Ireland, Jun. 4-7, 2012, 2012. [Online]. Available: http://www.aaai.org/ocs/index.php/ICWSM/ICWSM12/paper/view/4660.

A. Culotta, N. K. Ravi, and J. Cutler, "Predicting the demographics of twitter users from website traffic data," in Proceedings of the Twenty-Ninth AAAI Conference on Artificial Intelligence, ser. AAAI' 15. AAAI Press, 2015, pp. 72-78. [Online]. Available: http://dl.acm.org/citation.cfm?id=2887007.2887018.

M. Kosinski, Y. Bachrach, P. Kohli, D. Stillwell, and T. Graepel, "Manifestations of user personality in website choice and behaviour on online social networks," Mach. Learn., vol. 95, No. 3, pp. 357-380, Jun. 2014. [Online]. Available: http://dx.doi.org/10.1007/sl0994-013-5415-y.

E. Malmi and I. Weber, "You are what apps you use: Demographic prediction based on user's apps," CoRR, vol. abs/1603.00059, 2016. [Online]. Available: http://arxiv.org/abs/1603.00059.

F. Pedregosa, G. Varoquaux, A. Gramfort, V. Michel, B. Thirion, O. Grisel, M. Blondel, P. Prettenhofer, R. Weiss, V. Dubourg, J. Vanderplas, A. Passos, D. Cournapeau, M. Brucher, M. Perrot, and E. Duchesnay, "Scikit-learn: Machine learning in Python," Journal of Machine Learning Research, vol. 12, pp. 2825-2830, 2011.

F. M. Harper and J. A. Konstan, "The movielens datasets: History and context," ACM Trans. Interact. Intell. Syst., vol. 5, No. 4, pp. 19:1-19:19, Dec. 2015. [Online]. Available: http://doi.acm.org/10.1145/2827872.

* cited by examiner

VALIDATING A TARGET AUDIENCE USING A COMBINATION OF CLASSIFICATION ALGORITHMS

BACKGROUND

Network users consume digital content at an ever-increasing rate. For example, network users increasingly consume digital video, audio, images, and other content available through websites and applications. As network consumption increases, however, digital publishers and advertisers expand efforts to strategically place digital content before users to cater to their interests and to introduce potentially useful products. This proliferation of digital content sometimes inundates users with digital videos, images, and other digital content that neither relates to nor interests the network users. Without filters that detect network users' interests or characteristics, digital publishers and advertisers risk desensitizing users to the digital content placed before them and missing opportunities to place relevant content before appropriate network users.

To avoid inundating or desensitizing users, digital publishers and advertisers seek to better identify specific demographic groups of network users and strategically place digital content of interest before such groups. Some conventional methods of content placement use computers and/or servers that attempt to place digital content before a certain demographic group of network users. But demographic identification is often inaccurate, and relevant demographic information difficult to obtain. Among other reasons, such demographic information is often unavailable because network-user profiles are sometimes incomplete, inaccurate, unavailable, or non-existent for the digital publisher or digital advertiser. To maintain privacy, users often (and understandably) do not share their demographic details or do not provide correct information. This lack of demographic information hinders publishers' efforts to place relevant digital content before a demographic group with certainty and, subsequently, for the publisher and an advertiser to validate whether the digital content was properly placed before a target demographic.

For demographic-content placement, conventional approaches often identify the demographic mix of viewers for each digital content item (available from the third party) and place digital advertisements within (or attached to) those digital content items with audiences having a higher concentration of a given demographic target. This conventional approach to demographic-content placement gives better accuracy than showing digital advertisements at random, but it often fails to provide personalized content placement that caters to network users' interests. Consequently, the conventional approach often serves a large fraction of impressions to an unintended demographic target.

Other conventional methods of content placement use computers to place digital content before network users who demonstrate a particular behavior or a pattern of behavior. But behavioral targeting often does not identify network users interested in a promoted digital content item (e.g., digital advertisement). Accordingly, conventional methods of content placement often result in identifying too broad a base of network users before whom to place digital content.

Additionally, some computer-implemented methods of content placement apply conventional classification algorithms in an attempt to classify users of a population as having a characteristic. The methods then target those classified users with digital content. Unfortunately, conventional classification algorithms often incorrectly classify users. Such conventional classification algorithms are particularly inaccurate when labels (i.e., characteristics) are known for a small percentage of the population.

To test the accuracy of conventional classification algorithms and other computer-implemented conventional methods of content placement, some digital publishers and advertisers rely on outside firms to validate whether digital content has reached network users of interest. For example, some third-party services validate whether conventional content placement methods are accurate by using proprietary methods to provide reports that describe a demographic mix corresponding to a particular television show or other digital content items. But these reports often show the technical shortfalls of currently available computer-implemented methods of content placement by revealing that such methods are inaccurate, imprecise, and not cost effective in identifying a demographic group.

Despite using computer-implemented behavioral tracking and classification algorithms, computer-implemented methods of content placement consistently fail to extract sufficient information about a potential audience or account for digitally trackable factors that accurately identify demographic groups. Accordingly, computer-implemented methods of content placement often place digital content before unintended network users at inefficient rates.

SUMMARY

This disclosure describes one or more embodiments of systems and methods that solve one or more of the foregoing, or other, problems. To solve these and other problems, the disclosed systems and methods determine demographic labels for a user or a group of users by using digital inputs within a predictive model for demographic classification. In particular, the disclosed systems and methods use a unique combination of classification algorithms to determine demographic labels for users as a potential audience for digital content items.

For example, in certain embodiments, the disclosed systems and methods receive demographic-label statistics associated with digital content items (e.g., statistics from a third-party service). The disclosed systems and methods also access session-level data associated with particular digital content items that have been consumed by a group of users. This session-level data includes session-level features that correspond to each session in which a user consumed at least one of the particular digital content items. The disclosed systems and methods then use a first classification algorithm followed by a second classification algorithm to ultimately determine demographic labels. By applying the first classification algorithm, the systems and methods determine user-level-latent features for each user within the group of users based on the aggregate demographic-label statistics (e.g., acquired from or provided by a third party) and the particular digital content items consumed by each user within the group of users. By applying the second classification algorithm, the systems and methods determine a demographic label for each user within the group of users by using the user-level-latent features and session-level features as inputs.

The disclosed systems and methods use this combination of classification algorithms to enhance a computing device's accuracy when predicting a demographic label for a user or group of users. The systems and methods likewise utilize this unique combination of classification algorithms to determine demographic labels with an accuracy unmatched by conventional methods of content placement.

Additional features and advantages of one or more embodiments of the present disclosure will be set forth in the following description and will in part be obvious from the description or may be learned by the practice of the disclosed embodiments.

BRIEF DESCRIPTION OF THE DRAWINGS

The detailed description refers to the following drawings, which are briefly described below.

DETAILED DESCRIPTION

Figure 1:
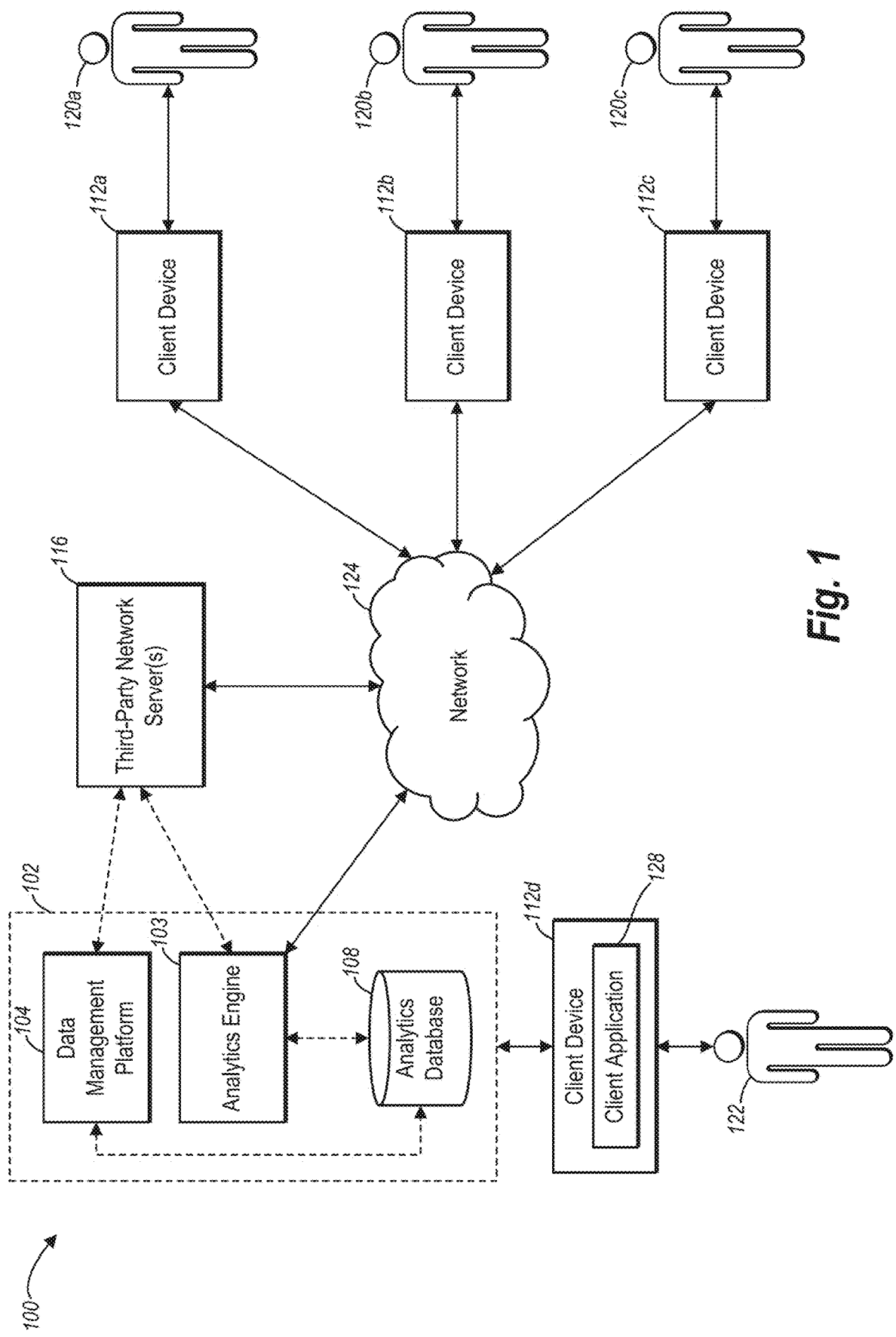
FIG. 1 illustrates a block diagram of an environment in which a data management system can operate in accordance with one or more embodiments.

This disclosure describes one or more embodiments of a data management platform that determines demographic labels for a user (or a group of users) by employing digital inputs within a predictive model for demographic classification. In particular, the data management platform uses a unique combination of classification algorithms to determine demographic labels for users who may later receive digital content items as part of a target audience.

For example, in certain embodiments, the disclosed data management platform receives demographic-label statistics associated with digital content items. In some instances, a third-party service provides the demographic-label statistics that, for example, indicate percentages of different demographic groups who viewed particular digital videos. Independent of those demographic-label statistics, the data management platform further accesses session-level data associated with the digital content items. Such session-level data may include an aggregated dataset that identifies the digital content items consumed by a group of users on different dates and times. The session-level data also includes session-level features that correspond to each session in which a user consumed at least one of the digital content items, with session-level features such as a web browser used or a digital content item consumed by a user on a specific date and time.

After accessing the session-level data, the data management platform utilizes a first classification algorithm to determine user-level-latent features for each user within the group of users. A user-level-latent feature may be, for example, a probability that a user who viewed a digital video is male or female. The first classification algorithm determines such user-level-latent features based on the demographic-label statistics and the digital content items consumed by each user within the group of users. Using the user-level-latent features and session-level features as inputs, the data management platform then utilizes a second classification algorithm to determine a demographic label for each user within the group of users.

Among other advantages, the disclosed use of the combination of classification algorithms by the data management platform enhances a computing device's accuracy when predicting a demographic label for a user or group of users. Indeed, the unique combination of classification algorithms determines demographic labels with an accuracy unmatched by conventional methods of content placement. Whereas conventional classification algorithms have proven relatively inaccurate when determining demographic labels when demographic labels are known for only a small percentage of the population (e.g., less than 30%). By contrast, the combination of classification algorithms accurately determines demographic labels, even when demographic labels are known for only a small percentage of the population. This improved accuracy enables digital publishers and advertisers to both place fewer digital content items and more efficiently reach their intended audience with those digital content items (e.g., by placing fewer digital advertisements but also reaching a higher percentage of a target demographic).

In some embodiments, the disclosed data management platform also enables digital publishers and advertisers to personalize digital content items for an individual user. For example, by employing the disclosed combination of classification algorithms, the disclosed data management platform facilitates identifying digital content items suitable for a particular user. When doing so, in some embodiments, the data management platform generates a recommendation for a particular user (or a group of users) based on the demographic label determined by the data management platform (e.g., a suggested advertisement, application, or video for a particular demographic of users). Additionally, in some embodiments, the data management platform generates a demographic-label report that indicates a demographic label for a group of users. Such a demographic-label report enables digital publishers or digital advertisers to validate whether the digital content items they placed have reached a particular audience.

In addition to enhancing the accuracy of determining demographic labels and personalizing digital content items, certain embodiments of the disclosed data management platform also include an updating function that updates the accuracy of a determined demographic label for a user or group of users. For example, in certain circumstances, the data management platform detects and/or receives updated demographic-label statistics for particular digital content items (e.g., from a third-party service) or updated session-level data. Upon receiving the updated demographic-label statistics, the data management platform applies the first classification algorithm to re-determine user-level-latent features.

Alternatively, in some instances, and as explained further below, the data management platform assigns weights to different user-level-latent features to reflect updates within user-level-latent features, such as by assigning a weight to a previously determined user-level-latent feature and assigning another weight to an updated user-level-latent feature.

Similarly, in some embodiments, upon receiving the updated session-level data, the data management platform applies the second classification algorithm to re-determine a demographic label for a user or group of users. These updating mechanisms enable the data management platform to determine increasingly accurate demographic labels (in a feedback loop) based on additional information. Accordingly, the updating mechanisms provide digital publishers and digital advertisers with more flexibility than conventional methods of content placement.

Figure 2:
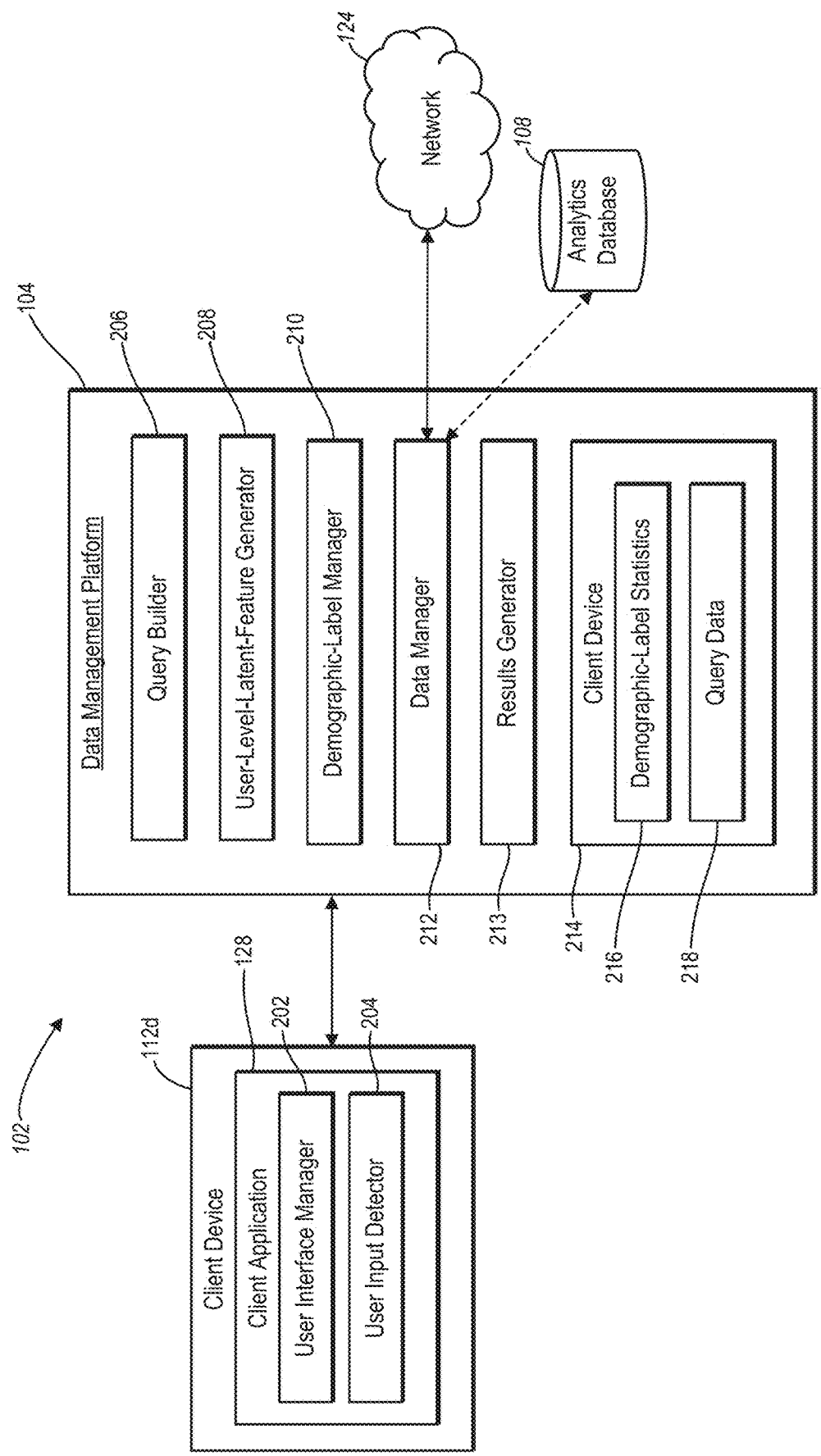
FIG. 2 illustrates a schematic diagram of the data management system of FIG. 1 in accordance with one or more embodiments.

Turning now to the figures, FIGS. 1 and 2 provide an overview of an environment in which a data management system can operate and an example of an architecture for the data management platform. After providing an overview of the environment and the architecture of the data management platform, this disclosure describes reporting features of the data management platform with reference to FIGS. 3-4B.

FIG. 1 is a block diagram illustrating an environment 100 in which a data management platform 104 can operate in accordance with one or more embodiments. As illustrated in FIG. 1, the environment 100 includes a data management system data management system 102; client devices 112*a*, 112*b*, 112*c*, and 112*d*; third-party network server(s) 116, such as web server(s); users 120*a*, 120*b*, and 120*c*; an administrator 122; and a network 124, such as the Internet. As further illustrated in FIG. 1, the client devices 112*a*-112*c* communicate with the third-party network server(s) 116 (and, in some embodiments, the data management platform 104) through the network 124. Although FIG. 1 illustrates an arrangement of the client devices 112*a*-112*d*, the administrator 122, the users 120*a*-120*c*, the network 124, the third-party network server(s) 116, and the data management system 102, various additional arrangements are possible. For example, the client devices 112*a*-112*c* may directly communicate with the third-party network server(s) 116 and thereby bypass the network 124. Similarly, the client device 112*d* may communicate with the data management system 102 through the network 124 rather than directly communicating with the data management system 102.

As shown in FIG. 1, the users 120*a*-120*c* comprise users who access one or more websites, applications, or other digital content items provided (in whole or in part) by the third-party network server(s) 116. While FIG. 1 illustrates three users 120*a*-120*c*, in alternative embodiments, the environment 100 includes fewer or more than three users 120*a*-120*c*. For example, in other embodiments, the environment 100 includes hundreds, thousands, millions, or even billions of users.

As also shown in FIG. 1, the data management system 102 includes the data management platform 104 and an analytics database 108. The data management platform 104 accesses, manages, analyzes, and queries data corresponding to some or all of the users 120*a*-120*c*. For example, the data management platform 104 accesses and analyzes data corresponding to some or all of the users 120*a*-120*c* that is stored within the analytics database 108. Additionally, in some embodiments, the data management platform 104 accesses, manages, analyzes, and queries data corresponding to other users associated with the third-party network server(s) 116.

In one or more embodiments, the client devices 112*a*-112*c* transmit some or all of the data (corresponding to some or all of the users 120*a*-120*c*) through the network 124 to the third-party network server(s) 116. To generate the transmitted data or initiate communications, the users 120*a*-120*c* interact with the client devices 112*a*-112*c*, respectively. The client devices 112*a*-112*c* may include, but are not limited to, mobile devices (e.g., smartphones, tablets), laptops, desktops, or any other type of computing device, such as those described below in relation to FIG. 8. Similarly, the network 124 may comprise any of the networks described below in relation to FIG. 8. Accordingly, the network 124 may be any suitable network over which the client devices 112 (or other components) may access the third-party network server(s) 116 or vice versa.

In addition to generating data, the client devices 112*a*-112*c* communicate with the third-party network server(s) 116 for a variety of purposes. For example, in one or more embodiments, the client devices 112*a*-112*c* communicate with the third-party network server(s) 116 to stream video or audio, request a webpage, upload a file, update a profile, download a game, and so forth. Accordingly, in some embodiments, the third-party network server(s) 116 comprise or support a webserver, a file server, a social networking system, a program server, an application store, or a digital publisher. When the third-party network server(s) 116 comprise webserver(s) to support a video streaming service, for example, the client device 112*a* may communicate with the webserver by requesting videos from the webserver to stream using a web browser operating on the client device 112*a*.

In one or more embodiments, the data management system 102 uses an analytics server 103 to track various user data related to the communications between the client devices 112*a*-112*c* and the third-party network server(s) 116. For example, the analytics server 103 tracks user data that represents different session-level features of a session including, but not limited to, digital content item(s) consumed (e.g., title of video watched or audio, genre of video or audio), web browser used (e.g., Chrome, Firefox, Safari), operating system used (e.g., Windows 10, Mac OS X, Linux), data requests (e.g., URL requests, link clicks, streaming requests), date data (e.g., a date on which digital content item was consumed, a designation of a weekday, weekend, or holiday), time data (e.g., a time stamp for clicking a link, a time duration for a web browser accessing a webpage, a time stamp for closing an application), path tracking data (e.g., data representing webpages a user visits during a given session), demographic data (e.g., an indicated age, sex, or socioeconomic status of a user when available), geographic data (e.g., a physical address, IP address, GPS data), and transaction data (e.g., order history, email receipts).

As suggested by the foregoing examples, the term "session" refers to interactions between two or more computing devices within a given time frame in which the computing devices exchange information. To perform those interactions, a user may interact with a graphical user interface of a webpage or application to send or request information over a network (or over a direct connection). During a session, a user may consume a digital content item by watching one or more videos, listening to audio content, visiting or viewing one or more webpages, using a mobile application, inputting a query into a webpage or application, or otherwise consuming some other form of a digital content item. The term "consume" refers to an act of using a digital content item. For example, a user may consume a digital video by viewing the digital video, consume digital audio content by listening to the digital audio content, or consume a mobile application by accessing the mobile application.

Relatedly, the term "session-level data" refers to digital data corresponding to a session. Session-level data includes data corresponding to an individual session. Session-level data also may include an aggregated and organized dataset that compiles many different sessions of different users. For example, session-level data may include an aggregated dataset of user interactions with one or more third-party network server(s) 116. Session-level data also includes session-level features. A "session-level feature" refers to an observable digital property of an individual session. For example, a session-level feature includes, but is not limited to, digital content item(s) consumed, web browser used, operating system used, data requests, date data, time data, profile information, client device identification, or any other session-level feature mentioned above.

For example, when tracking user data, the third-party network server(s) 116 may comprise a webserver that supports a video streaming service and generates session-level data. In some such instances, the client device 112a communicates with the third-party network server(s) 116 to request data to stream a certain video to the client device 112a. By accessing the communications from the client device 112a to the third-party network server(s) 116, the data management system 102 tracks the data request (e.g., for the streamed video), the title and genre of the video file requested, the date and time the request was made, the web browser used to make the request, the operating system used by the requesting client device 112a, the geographic information associated with the client device 112a (e.g., a geographic area associated with an IP address assigned to the client device 112a or GPS information identifying a location of the client device 112a), or any other session-level data corresponding to a session of the user 120a.

The data management system 102 tracks user data in various ways. In one or more embodiments, the third-party network server(s) 116 tracks the user data and then reports the tracked user data to the analytics server 103. Alternatively, the data management system 102 receives tracked user data directly from the client devices 112a-112c. In particular, the data management system 102 may receive information through data stored on a client device (e.g., a browser cookie, cached memory), embedded computer code (e.g., tracking pixels), a user profile, or engage in any other type of tracking technique. Accordingly, the data management system 102 can receive tracked user data from the third-party network server(s) 116, the network 124, and/or the client devices 112a-112c. While the preceding examples primarily describe the analytics server 103 as tracking user data, the data management platform 104 (or some other component of the data management system 102) track user data in alternative embodiments.

As also illustrated in FIG. 1, the data management platform 104 is communicatively coupled to an analytics database 108. In one or more embodiments, the data management platform 104 accesses and queries tracked session-level data from the analytics database 108. As shown in FIG. 1, the analytics database 108 is separately maintained from the analytics server 103 and the data management platform 104. Alternatively, in one or more embodiments, the analytics server, the data management platform 104, and the analytics database 108 comprise a single combined system, subsystem, or device.

As also shown in FIG. 1, the environment 100 includes a client device 112d that implements a client application 128. In one or more embodiments, an administrator 122 or other user queries data from the data management platform 104 by using the client device 112d. For example, in some embodiments, the data management platform 104 provides various graphical user interface controls to the client application 128 within the client device 112d to enable the administrator 122 to query the data management system 102 for a demographic composition of a group of users. Additionally, in some embodiments, the data management platform 104 receives and processes demographic queries from the client application 128 and provides demographic query results based on the query.

Turning now to FIG. 2, this figure illustrates a schematic diagram of one embodiment of the data management system 102. As shown, the data management system 102 includes, but is not limited to, the data management platform 104 communicatively coupled to the network 124 and the analytics database 108. While FIG. 2 does not show the analytics server 103, the data management system 102 includes the analytics server 103 in one or more embodiments. As shown in FIG. 2, the data management system 102 also includes or supports a client application 128 running on the client device 112d. The data management platform 104 includes, but is not limited to, a query builder 206, a user-level-latent-feature generator 208, a demographic-label manager 210, a data manager 212, a result generator 213, and a data storage 214. In some embodiments, the data management system 102 includes or is coupled to the analytics database 108, as indicated by the dotted line in FIG. 2.

As noted above, the data management system 102 processes queries of demographic information. The query builder 206 shown in FIG. 2 facilitates those queries. The query builder 206 communicates with the client application 128 to receive user inputs and provide query building controls. These query building controls facilitate building or configuring a query. For example, in some embodiments, a user may interact with a graphical user interface of the client device 112d to build a query by indicating a user (or group of users) for whom the user would like to determine a demographic label. The query may, for example, request that the data management platform 104 determine a demographic label for a user (or group of users) who requested, received an impression of, viewed, interacted with, or streamed any digital content item or series of digital content items. The term "digital content item" refers to any item of digitally encoded media. For example, digital content items include, but are not limited to, advertisements, software applications, audio content, video content, and webpages.

The term "demographic label" refers to a description of a particular segment of users. The demographic label may describe or define a segment of users by gender, age, nationality, geographic location, ethnicity, race, income, education level, occupation, marital status, parental status, height, weight, religion, or some other category of a population. A demographic label may include a single category or overlapping categories, such as a user characteristic for women (as an example of a single category), user characteristics that specify women between the ages of 19 and 25 (as an example of overlapping categories), or user characteristics that specify married women between the ages of 26 and 31 who graduated from college and have at least one child (as another example of overlapping categories).

As indicated above, a query may request that the data management platform 104 determine a demographic label for a user (or group of users) or specify whether a user (or any portion of a group of users) satisfies a particular demographic label. For example, a query may request that the data management platform 104 determine a demographic label for a group of users who received an impression of a particular advertisement campaign during a defined time frame, such as a group of users who received an impression of a beverage advertising campaign between Nov. 25, 2016 and Dec. 14, 2016. Alternatively, a query may request that the data management platform 104 determine whether any of the users who streamed a particular video from a particular website satisfy a demographic label for men between the ages of 30 and 40 who graduated from high school.

In response to receiving an indication of a query, the query builder 206 parses the query and sends data representing the query to another component of the data management platform 104, such as the user-level-latent-feature generator 208. For example, in some embodiments, the query builder 206 parses a received query, error checks the query, and separates the query into portions that other components of the data management platform 104 can analyze. Additionally, in some embodiments, the query builder 206 provides additional query building controls to further refine a query or to fix an error.

Regardless of the query, the data management platform 104 uses a combination of classification algorithms when processing the query, including a first classification algorithm and a second classification algorithm. As shown in FIG. 2, the user-level-latent-feature generator 208 uses the first classification algorithm to determine a user-level-latent feature for a user based on demographic-label statistics. The term "user-level-latent feature" refers to a digital property associated with a user that is hidden or unobservable. For example, a user-level-latent feature may include a probability that a demographic label applies to the user (e.g., a probability that a user who watched a television show is female). As another example, a user-level-latent feature may represent a frequency of digital content items consumed by users of a particular demographic label.

As noted above, the user-level-latent-feature generator 208 determines a user-level-latent feature based on demographic-label statistics. The term "demographic-label statistics" refers to digital data comprising statistics that describe or correspond to a particular demographic label or multiple demographic labels. In some cases, the demographic-label statistics describe a demographic label with respect to a particular digital content item. For example, a third-party service may provide demographic-label statistics that identify a frequency or percentage of users of a particular demographic label who consume a particular digital content item, such as a report that indicates a certain percentage of viewers who watch a given television show that are female between the ages of 11 and 16.

In some embodiments, the user-level-latent-feature generator 208 uses a Naive Bayesian algorithm to determine a prior probability of a possible demographic label for a user. Accordingly, in embodiments that use the Naive Bayesian algorithm, one of the user-level-latent features comprises the prior probability. Moreover, the user-level-latent-feature generator 208 uses certain demographic-label statistics as inputs into the Naive Bayesian algorithm. For example, in some embodiments, the user-level-latent-feature generator 208 relies on demographic-label statistics of a particular digital content item, such as a collective probability that a demographic label applies to consumers of the particular digital content item. This demographic-label statistic is available for each digital content item from a third party, which can validate the effectiveness of an advertising campaign. In this context, the term "consumer" refers to a user who consumed a digital content item, such as a viewer who viewed a show or a user who visited a webpage.

For example, if a viewer watched several television shows, the user-level-latent-feature generator 208 could determine a prior probability that a possible demographic label applies to the viewer based on demographic-label statistics (e.g., statistics provided by a third-party service). If the query designated the possible demographic label as "female," the user-level-latent-feature generator 208 would determine a prior probability that the viewer who watched several television shows is female based on, for example, the collective probability that a consumer who watched several shows is female (e.g., a percentage of females who watched a particular show).

When using the Naive Bayesian algorithm in such an example, the user-level-latent-feature generator 208 may represent shows watched by the viewer (v) as a vector $s_v=\{s_v^i, \ldots, s_v^j\}$ (e.g., a listing) and a possible demographic label as g. Given that the vector $s_v=\{s_v^i, \ldots, s_v^j\}$ and demographic-label symbol g, in some embodiments, the user-level-latent-feature generator 208 determines the prior probability that the possible demographic label (e.g., female) applies to the viewer using the following function:

$$Pr(g \mid s_v) \propto Pr(s_v \mid g) \cdot Pr(g) \qquad (1)$$

$$\propto \prod_{i=1}^{j} Pr(s_v^i \mid g) \cdot Pr(g)$$

$$\propto \prod_{i=1}^{j} \frac{Pr(s_v^i \mid g)}{Pr(g)} * Pr(g)$$

In function (1), $Pr(s_v^i \mid g)$ represents the collective probability that a viewer who watched a particular television show is female. Using function (1), the data management platform 104 would identify the collective probability that a viewer who watched a particular television show is female from within demographic-label statistics.

As indicated by function (1), the user-level-latent-feature generator 208 uses the Naive Bayesian algorithm to account for a collective probability that a viewer is female corresponding to each show watched by the viewer. In other words, the prior probability that a viewer is female is proportional to the product of each collective probability for each show watched by the viewer. Additionally, when using function (1) and the Naive Bayesian algorithm, the user-level-latent-feature generator 208 assumes that a user's selection of one digital content item is independent of the user's selection of another digital content item. For example, function (1) assumes that the viewer's selection to watch on television show is independent of the viewer's selection to watch another television shown.

While the preceding embodiment of the user-level-latent-feature generator 208 uses function (1) to determine a prior probability of whether a viewer is female, the user-level-latent-feature generator 208 can also use a variation of function (1) to determine the prior probability that any possible demographic label applies to a user based on consumption of any digital content item. Accordingly, the user-level-latent-feature generator 208 can use variations of function (1) to determine whether a user is a certain gender, age, nationality, or ethnicity or has a certain income, education level, occupation, or satisfies any other possible demographic label. The user-level-latent-feature generator 208 may likewise determine whether a possible demographic label applies to a user based on a set of videos, audio streams, webpages, applications, or some other digital content item consumed.

Regardless of the possible demographic label used or digital content item consumed, function (1) determines prior probabilities from demographic-label statistics and not from session-level features—except for a single session-level feature of digital content item(s) consumed. Because the Naive Bayes algorithm assumes that features are conditionally independent—and session-level features are not conditionally independent of each other—using other session-level features within function (1) could introduce significant bias to the determined prior probability. As described below, the data management platform 104 uses the session-level features as part of the second classification algorithm.

In addition or in the alternative to using the Naive Bayes algorithm as part of the first classification algorithm, in some embodiments, the user-level-latent-feature generator 208 determines a frequency of digital content items consumed by users of a particular demographic label based on demographic-label statistics. This frequency determination may be the first classification algorithm by itself or may be used in combination with the Naive Bayes algorithm as the first classification algorithm.

For example, in some embodiments, the user-level-latent-feature generator 208 represents a frequency of digital content items consumed by users of a particular demographic label by counting a number of digital content items predominantly consumed by users of the particular demographic label. The user-level-latent-feature generator 208 determines whether a digital content item is predominantly consumed by users of a particular demographic label based on the demographic-label statistics. In some such embodiments, one of the user-level-latent features comprises the number of digital content items consumed by users of a particular demographic label.

For example, the user-level-latent-feature generator 208 may determine a frequency by determining a first count of digital content items predominantly consumed by users of a first demographic label, a second count of digital content items predominantly consumed by users of a second demographic label, and a third count of digital content items consumed by users of either the first or second demographic labels. To continue one of the examples from above—using a gender as a demographic label—the first count may be a number of television shows that a viewer watched that are predominantly watched by males (i.e., a number of "male dominated shows"), the second count may be a number of television shows that the viewer watched that are predominantly watched by females (i.e., a number of "female dominated shows"), and the third could may be a number of television shows that the viewer watched and that are watched equally by males or males within a statistical significance (i.e., a number of "gender-neutral shows"). In this example, the user-level-latent-feature generator 208 assigns a classifier to a digital content item—such as classifiers of female dominated shows, male dominated shows, and gender-neutral shows—as a precursor to determining the user-level-latent features. Using these classifiers, the user-level-latent-feature generator 208 determines the first, second, and third counts of digital content items assigned to a particular classifier, with each separate count comprising a user-level-latent feature.

As just noted, the user-level-latent-feature generator 208 uses the demographic-label statistics to assign classifiers to digital content items consumed by the user, such as by classifying whether a digital content item is predominantly consumed by a particular demographic label. In some embodiments, the user-level-latent-feature generator 208 assigns classifiers by determining a threshold percentage or other measurement from the demographic-label statistics and classifies each digital content item as predominantly consumed by a particular demographic label based on the threshold. For example, the user-level-latent-feature generator 208 may determine a threshold of 60% and above of female viewers to classify a television show as female dominated, a threshold of 60% and above of male viewers to classify a television show as male dominated, and a threshold of anything between 41% and 59% of female viewers to classify a show as gender-neutral.

While the user-level-latent-feature generator 208 determines user-level-latent features corresponding to gender in the preceding examples, the user-level-latent-feature generator 208 may determine user-level-latent features corresponding to any demographic label. In other words, in some embodiments, the user-level-latent-feature generator 208 uses the Naive Bayes algorithm, classifier determinations, or another classification algorithm to determine user-level-latent features corresponding to any possible demographic label (e.g., age, education level, income). Additionally, in some embodiments, the user-level-latent-feature generator 208 users the first classification algorithm to determine both prior probabilities and frequency counts (as described above) as user-level-latent features.

When determining a possible demographic label, the user-level-latent-feature generator 208 may determine a possible demographic label with overlapping or different characteristics. For example, in some embodiments, the possible demographic label comprises different user characteristics, such as a first user characteristic for gender and a second user characteristic for age. A skilled artisan will recognize that these different user characteristics may overlap for users, such as when the user-level-latent-feature generator 208 determines a possible demographic label of women between the ages of 40 and 45.

After using a first classification algorithm, the data management platform 104 uses the outputs of the first classification algorithm in a second classification algorithm. As shown in FIG. 2, the data management platform 104 also includes the demographic-label manager 210. The demographic-label manager 210 determines a demographic label for a user using the second classification algorithm. When doing so, the demographic-label manager 210 determines the demographic label for a user based on any of the user-level-latent features determined by the user-level-latent-feature generator 208 (e.g., prior probabilities or frequency counts) and session-level features from demographic-label statistics (e.g., time of day that a user consumed a digital content item, web browser used, operating system used).

In some embodiments, the data management platform 104 trains a supervised learning model to generate coefficients to be used in the second classification algorithm. For example, in some embodiments, the data management platform 104 trains a supervised learning model using training data, such as by training a logistic regression model using demographic-label statistics comprising a verified demographic label for a group of users. For example, the data management platform 104 may train a logistic regression model using demographic-label statistics that include a data indicating a set of users have self-identified as female or male or who have otherwise verified their gender or some other demographic label. By using demographic-label statistics with verified demographic labels, the data management platform 104 trains the supervised learning model to generate coefficients that-when used by the demographic-label manager 210 with user-level-latent features and session-level features as inputs—would accurately determine a demographic label for a user who has a verified demographic label.

Regardless of whether the data management platform 104 trains a supervised learning model, the demographic-label manager 210 applies the second classification algorithm to determine a demographic label for a user. When doing so, the demographic-label manager 210 may apply different supervised learning algorithms, such as a regression algorithm (e.g., linear regression) or a classifier algorithm (e.g., linear classifiers, binary and multiclass classification).

For example, in some embodiments, the demographic-label manager 210 uses a logistic regression to determine a statistical probability that a demographic label applies to a user. In some such embodiments, the demographic-label manager 210 may determine the statistical probability of a demographic label based on a number of sessions for a user, one or more user-level-latent features for a user, session-level features, and coefficients determined by a supervised learning model. Each of the number of sessions for a user, the one or more user-level-latent features for a user, the session-level features, and the coefficients determined by the supervised learning model may be inputs for the second classification algorithm.

Logistic regression provides an example of the second classification algorithm. To continue one of the examples from above, suppose the demographic-label manager 210 used television shows as a digital content item and viewers (v) as an example user in one embodiment of the second classification algorithm. In that embodiment, the demographic-label manager 210 determines whether a demographic label (e.g., female) applies to a viewer by using a logistic regression and taking the mean of each determined demographic label for all sessions of the viewer. For example, the demographic-label manager 210 determines a demographic label for a viewer who has watched two or more television shows using the following function:

$$Pr(\hat{g} | m_v) = \frac{1}{N_i} \sum_{1}^{N_i} \frac{e^{(\hat{\alpha} + X_{vi} \cdot \hat{\gamma} + X_v \cdot \hat{\delta})}}{1 + e^{(\hat{\alpha} + X_{vi} \cdot \hat{\gamma} X_v \cdot \hat{\delta})}} \qquad (2)$$

In function (2), g represents the demographic label, $N_i$ represents the number of sessions of viewer (v), $X_{vi}$ represents the session-level features, $X_v$ represents the user-level-latent features, and $\{\hat{\alpha}, \hat{\gamma}, \hat{\delta}\}$ represent the coefficients determined by a logistic regression model. By using equation (2), the demographic-label manager 210 determines the statistical probability that the viewer is female.

While the preceding embodiment of the demographic-label manager 210 uses function (2) to determine a statistical probability of whether a viewer is female, the demographic-label manager 210 can use a variation of function (2) to determine the statistical probability that any demographic label applies to a user based on consumption of any digital content item. Accordingly, the demographic-label manager 210 can use variations of function (2) to determine whether a user is a certain gender, age, nationality, or ethnicity or has a certain income, education level, occupation, or satisfies any other demographic label. Moreover, the demographic-label manager 210 may determine the demographic label for a user based on a set of videos, audio streams, webpages, applications, or some other digital content item consumed by the user.

In addition to using the first second classification algorithms to determine a single demographic label for a single user, in some embodiments, the data management platform 104 uses the first and second classification algorithms to determine a single demographic label for multiple users, multiple demographic labels for a single user, or multiple demographic labels for multiple users. For example, in some embodiments, the data management platform 104 repeatedly uses the first and second classification algorithms (with demographic-label statistics and session-level features relevant to each user) to determine a single demographic label or multiple demographic labels for multiple users. Alternatively, in some embodiments, the data management platform 104 uses the first and second classification algorithms to determine one demographic label for a user and then again uses the first and second classification algorithms to determine another demographic label for the same user. In such embodiments, the data management platform 104 repeats the first and second classification algorithms for each demographic label.

The data management platform 104 not only may determine a demographic label for a user (or multiple users) but, in some embodiments, it also updates its determination of the demographic label. For example, in some embodiments, the data management platform 104 receives updated demographic-label statistics associated with certain digital content items. When doing so, the user-level-latent-feature generator 208 may automatically detect or query the data storage 214 (or third-party network server(s) 116) for updated demographic-label statistics. Upon receiving the updated demographic-label statistics, the data management platform 104 again applies the first classification algorithm to re-determine user-level-latent features consistent with the description above. In some such cases, the user-level-latent-feature generator 208 relies on the updated demographic-label statistics to re-determine prior probabilities of a possible demographic label for a user (or multiple users) or to re-determine a frequency of digital content items consumed by users of a particular demographic label (e.g., a count of digital content items assigned to a classifier).

Additionally or alternatively, in some embodiments, after updating a determination of a demographic label, the data management platform 104 assigns weights to previously determined user-level-latent features and to re-determined user-level-latent features to combine the user-level-latent features to form a weighted composite user-level-latent feature. For example, in some such cases, the data management platform 104 assigns a weight to previously determined prior probabilities of a possible demographic label for a user (or multiple users) and another weight to re-determined prior probabilities of a possible demographic label for the user (or multiple users). The data management platform 104 then combines the weighted previously determined prior probability of a possible demographic label and the weighted re-determined prior probability of a possible demographic label (by summation or product) to generate a composite weighted prior probability. In some embodiments, the data management platform 104 weights and combines each previously determined and re-determined prior probability as part of the updating process.

Additionally, in some such embodiments, the data management platform 104 trains a first classification algorithm, such as a Naive Bayes algorithm, to generate weights for the previously determined user-level-latent features and re-determined user-level-latent features. For example, the data management platform 104 trains a Naive Bayes algorithm using training data using demographic-label statistics comprising a verified demographic label for a group of users. In such examples, the data management platform 104 trains a Naive Bayes algorithm using demographic-label statistics that include data indicating a set of users have self-identified as female or male or who have otherwise verified their gender or some other demographic label. By using demographic-label statistics with verified demographic labels, the data management platform 104 trains the Naive Bayes algorithm to generate weights for a previously determined prior probability and a re-determined prior probability that would accurately predict a demographic label for a user who has a verified demographic label.

Similarly, in some embodiments, the data management platform 104 receives or accesses updated session-level data, including updated session-level features. When doing so, the demographic-label manager 210 may automatically detect or query the third-party network server(s) 116 (or the data storage 214) for updated session-level data. Upon receiving the updated session-level data, the data management platform 104 again applies the second classification algorithm to re-determine a demographic label for a user (or multiple users). In some such cases, the demographic-label manager 210 relies on the updated session-level features to re-determine a statistical probability that a demographic label applies to a user (or multiple users).

To facilitate managing data used by the first and second classification algorithms, some embodiments of the data management platform 104 also include a data manager 212. As shown in FIG. 2, the data manager 212 receives, organizes, and/or stores user data from the network 124, the third-party network server(s) 116, and/or the client devices 112a-112c (e.g., the data manager 212 performs read/write functions in connection with a database). For example, in one or more embodiments, the data management platform 104 accesses session-level data related to website usage provided or supported by the third-party network server(s) 116. As noted above, such session-level data may include session-level features, such as digital content item(s) consumed, a web browser used, operating system used, time data, path tracking data, demographic data, geographic data, or transactional data.

The data manager 212 identifies information within the analytics database 108 or the data storage 214 based on a query. For example, in some embodiments, the query builder 206 finalizes queries and sends those queries to the data manager 212 for processing. In one or more embodiments, the data manager 212 receives a query from the query builder 206 and accesses session-level data (or demographic-label statistics) within the analytics database 108 (or data storage 214) to identify stored session-level data (or demographics-label statistics) that satisfy the received query. In one such embodiment, the data manager 212 accesses the session-level data by extracting the session-level data from an analytics log within the analytics database 108 and aggregating the session-level data within the analytics database 108. In one or more embodiments, the data manager 212 organizes session-level data according to the user, session, digital content item, timestamp, or some other variable.

Once the appropriate user data has been identified, the data manager 212 generates a dataset that includes data satisfying the query. For example, a dataset may include data queried from within the analytics database 108 that satisfies a query, including session-level data describing various session-level features of a user's session. Upon generating a dataset, the data manager 212 optionally stores the query results as the dataset for later access, such as by storing the query as query data 218 within the data storage 214. Additionally, upon generating a dataset, the data manager 212 optionally transmits or communicates with the result generator 213.

As shown in FIG. 2, the result generator 213 provides query results for display on the client device 112d. In some embodiments, the result generator 213 organizes the dataset produced by the data manager 212 and provides the dataset to the client device 112d in various formats, such as datasets organized as reports and/or recommendations. For example, when the result generator 213 receives a dataset from the data manager 212 that corresponds to a query, the result generator 213 determines a result format suitable for the query. Alternatively, when the result generator 213 receives a dataset from the data manager 212, the result generator 213 identifies a request for a specific format for query results in the corresponding query (e.g., identifying a request that specifies results as a report and/or recommendation) or provides results in a default format (e.g., providing results as a report and/or recommendation as a default format).

In addition to determining a format for results, in some embodiments, the result generator 213 generates a report for display on the client device 112d. Depending on the query and the dataset, the result generator 213 generates a report that shows, for example, a demographic composition of a group of users or a report that shows a portion of a group of users that satisfy a demographic label. In some such embodiments, the result generator 213 provides a demographic-label report. This disclosure describes demographic-label reports further below with reference to FIG. 3. In additional or alternative embodiments, the result generator 213 generates an accuracy-reach report that indicates how accurately a digital publisher, advertiser, or other entity has reached its target audience with a digital content item. This disclosure describes demographic-label reports further below with reference to FIGS. 4A-4B.

In addition or in the alternative, the result generator 213 optionally provides recommendations for a user or a group of users to the client device 112d. For example, in some embodiments, the result generator 213 generates a recommendation for a user or group of users based on the demographic label determined for each of the group of users or for a single user. In some such embodiments, the result generator 213 analyzes the demographic-label statistics and/or the session-level data to identify digital content items consumed by users determined to have the same demographic label as other users-who have yet to consume the identified digital content items—and selects for recommendation one of the identified digital content items. In addition or in the alternative, the result generator 213 analyzes the demographic-label statistics and/or the session-level data to identify ratings of digital content items, including ratings by users determined to have the same demographic label as other users, and selects for recommendation one of the digital content items that a user (or group of users) have yet to consume based on ratings. In some embodiments, the result generator 213 analyzes the demographic-label statistics and/or the session-level data to identify a genre of digital content item that users determined to have a certain demographic label frequently consume and selects a digital content item of the identified genre that a particular user or group of users have yet to consume based on ratings.

For example, the result generator 213 may identify that female viewers frequently view a particular genre of television show and select a television show for recommendation with the highest ranking that a female viewer (or group of female viewers) have yet to watch. Alternatively, the result generator 213 may identify a product that female users frequently purchase and select an advertisement for the identified product for recommendation to a female user (or group of female users) that have yet to purchase the identified product. As another example, the result generator 213 may identify that males frequently download a particular genre of application and select an application for recommendation with the highest ranking of the identified genre that a male user (or group of male users) have yet to download.

Regardless of how the result generator 213 determines a digital content item for recommendation, the recommendation may comprise any suggested digital content item, including, but not limited to, a suggested advertisement, an application, an audio content item, a video content item, or a webpage. Moreover, the recommendation may be for an individual user, a group of users, or a portion of a group of users determined to satisfy any demographic label.

To take another example, the result generator 213 may identify, from within the demographic-label statistics and/or session-level data, that certain users determined to be female and between the ages of 19 and 25 often watch a television show or movie or purchase a particular product (e.g., a certain percentage of females between 19 and 25 watch a particular television show or purchase a particular product). Based on that identification, the result generator 213 may provide a recommendation to a portion of a group of users—who are also determined to be female and between the ages of 19 and 25 but have yet to consume a particular digital content item per the session-level data—that suggests the identified television show, movie, or product. In some embodiments, the suggested television show, movie, or product comes in the form of a digital advertisement.

As also shown in FIG. 2, the data management platform 104 includes the data storage 214. The data storage 214 maintains demographic-label statistics 216 and query data 218. In one or more embodiments, the demographic-label statistics 216 include data specific to digital content items identified by the data manager 212 that satisfy or are related to a query. For example, in some embodiments, the data management platform 104 stores a portion of the demographic-label statistics that include a dataset satisfying the query within the data storage 214. Moreover, in one or more embodiments, the query data 218 comprises queries received by the data management platform 104, including corrected or simplified queries from the query builder 206. Additionally, in some embodiments, the data storage 214 organizes a portion of the demographic-label statistics 216, such as a dataset, and the query data 218 such that query results stored as a dataset of the demographic-label statistics 216 correspond to its associated query in the query data 218.

As indicated above, the queries originate from a client device, such as the client device 112d. The data management system 102 also includes or supports the client application 128 operating on the client device 112d. As shown in FIG. 2, the client application 128 includes, but is not limited to, a user interface manager 202 and an input detector 204. In general, the data management system 102 enables the administrator 122 of the client device 112d to use the data management platform 104 via the client application 128 to format a query. Additionally, the data management system 102 enables the administrator 122 of the client device 112d to receive query results from the data management platform 104 via the client application 128.

The client application 128 may take various forms. In one or more embodiments, the client application 128 comprises a native application installed on the client device 112d. For example, in some embodiments, the client application 128 comprises a mobile application that installs and runs on a mobile device, such as a smart phone or a tablet. Alternatively, in other embodiments, the client application 128 comprises a desktop computer application, widget, or other form of a native computer program. Alternatively, the client application 128 comprises a remote application that the client device 112d accesses. For example, the client application 128 may be a web application that is executed within a web browser of the client device 112d.

As part of the client application 128, the user interface manager 202 provides, manages, and/or controls a graphical user interface (or simply "user interface") that enables a user to compose queries and receive query results, reports, and recommendations from the data management platform 104. For example, the user interface manager 202 provides a graphical user interface that facilitates composition of a query. Additionally, in some embodiments, the user interface manager 202 provides a graphical user interface within which the client device 112d displays query results provided by the data management platform 104, such as the results shown in a demographic-label report of FIG. 3 or the accuracy-reach reports of FIGS. 4A-4B.

As shown in FIG. 2, the client application 128 further includes a user input detector 204. In one or more embodiments, the user input detector 204 detects, receives, and/or facilitates user input in any suitable manner. In some embodiments, the user input detector 204 detects one or more user interactions between the administrator 122 (or some other user) and the graphical user interface. As referred to herein, a "user interaction" refers to a single interaction, or combination of interactions, received from a user with one or more input devices.

For example, in some embodiments, the user input detector 204 detects a user interaction from a keyboard, mouse, touch pad, touch screen, and/or any other input device. In the event the client device 112d includes a touch screen, the user input detector 204 detects one or more touch gestures (e.g., swipe gestures, tap gestures, force touch gestures, touch-and-press gestures, pinch gestures, or reverse pinch gestures) from a user who inputs a user interaction. In some examples, a user can provide the touch gestures in relation to and/or directed at one or more graphical objects or graphical elements of a graphical user interface.

The client application 128 also facilitates the data management platform 104 in assisting a user in building a query. A user may provide input (e.g., via a button click or a list item selection) indicating a type of query the user intends to build, such as a query for a demographic composition of a group of users or a query as to whether a group of users includes any users that satisfy a specific demographic label. In response to the user input detector 204 detecting the input, the query builder 206 may provide query building controls to the user interface manager 202 appropriate for the type of query indicated. Accordingly, in response to the user input detector 204 detecting user input, the client application 128 guides a user in appropriately configuring a query.

Referring now to FIG. 2 generally, components 108 and 202-214 can comprise software or hardware or a combination of software and hardware. For example, the components 108 and 202-214 can comprise one or more instructions stored on a non-transitory computer readable storage medium that are executable by a processor of one or more computing devices. When executed by the one or more processors, the computer-executable instructions of the data management system 102 cause computing device(s) to perform the methods described herein. Alternatively, the components 108 and 202-214 can comprise a special-purpose processing device to perform a certain function. Additionally or alternatively, the components 108 and 202-214 can comprise a combination of computer-executable instructions and hardware.

Additionally, although FIG. 2 illustrates the components 108 and 206-214 to be separate, any of the components 108 or 206-214 may be combined into fewer components, such as into a single facility or module or divided into more components as may be suitable for one or more embodiments. In addition, the components 108 and 206-214 may be located on or implemented by one or more computing devices, such as those described below in relation to FIG. 8.

Figure 3:
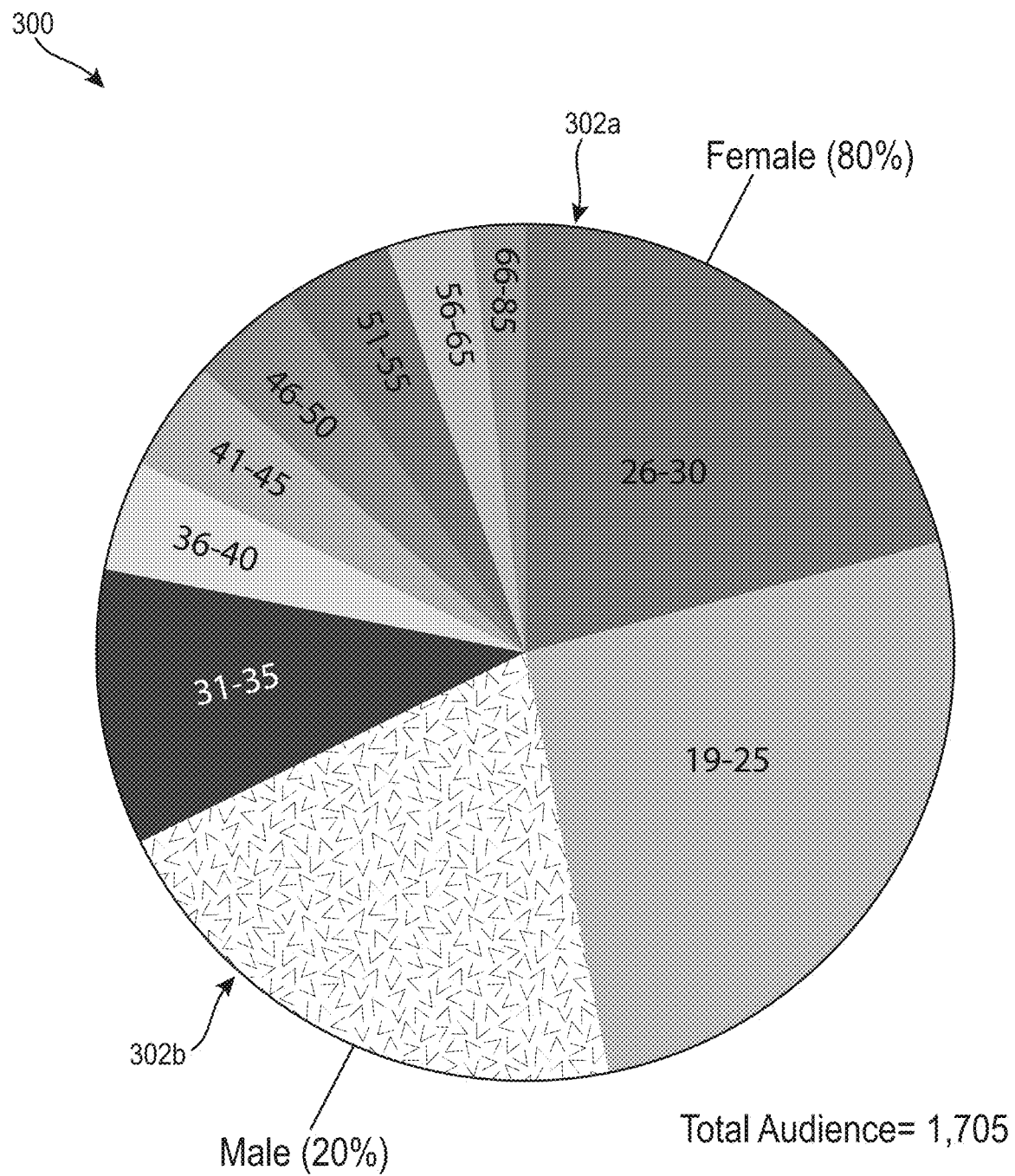
FIG. 3 illustrates a demographic-label report in accordance with one or more embodiments.

As noted above, the data management platform 104 includes various reporting functions. For example, in some embodiments, the result generator 213 of the data management platform 104 provides a report in response to a query, such as a query asking the data management platform 104 to determine a demographic label for a group of users. FIG. 3 illustrates an example of such a report. As shown in FIG. 3, the result generator 213 provides a demographic-label graph 300 in response to a query. In this case, the result generator 213 provides the demographic-label graph 300 in response to a query asking the data management platform 104 to determine a demographic label for a group of users who viewed a particular advertisement campaign during a defined timeframe (e.g., group of users who viewed a certain video advertisement during various sessions of streaming television shows or movies).

The demographic-label graph 300 shows that, out of a total audience of 1,705 users who viewed the advertisement campaign, the data management platform 104 determines that 80% of the viewers are female and 20% of the viewers are male. In addition to gender, the data management platform 104 determines another demographic label, age. As shown, a demographic-label sector 302a includes a breakdown of the female viewers' various age groups (e.g., ages 19-25, 26-30, 31-35). The demographic-label graph 300 also includes a demographic-label sector 302b within which the result generator 213 will provide an age breakdown of the male viewers-upon receiving an indication of a selection of the demographic-label sector 302b from the client device 112d. Accordingly, the demographic-label graph 300 indicates two different types of demographic labels (gender and age) that the data management platform 104 determines applies to the group of users.

To reach that determination, the data management platform 104 applies the first classification algorithm to demographic-label statistics that indicate a percentage of each gender who typically view the television shows viewed by the viewers who are the subject of this query. The data management platform 104 uses data showing the television shows viewed by each of the viewers when applying the first algorithm. The data management platform 104 also applies the second classification algorithm to, among other things, session-level features for the viewers who are the subject of the query.

Figure 4B:
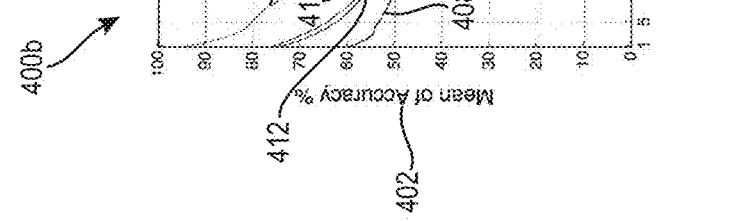
FIGS. 4A-4B illustrate an accuracy-reach report in accordance with one or more embodiments.
Figure 4A:
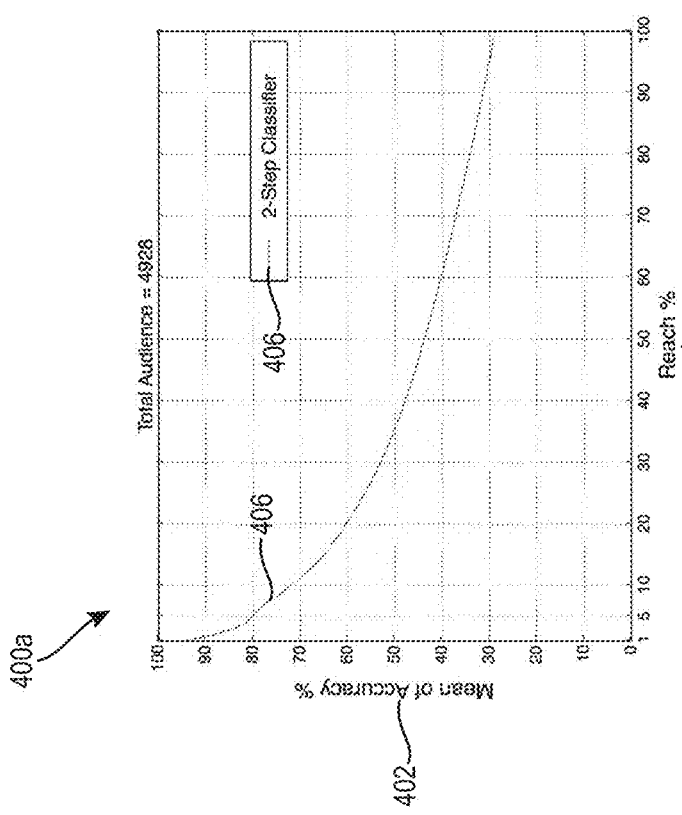

In addition to a demographic-label report, in some embodiments, the data management platform 104 provides an accuracy-reach report. An accuracy-reach report indicates how accurately a digital publisher, advertiser, or any other entity has reached its intended audience with a digital content item. To provide an accuracy-reach report, some embodiments use additional demographic-label statistics that include verified demographic labels for a group of users, as described above. FIGS. 4A-4B illustrate a couple of embodiments of an accuracy-reach report.

For example, FIG. 4A illustrates an accuracy-reach graph 400a. This graph represents the results of the data management platform 104 running several iterations of a first classification algorithm and a second classification algorithm on data for a group of viewers, including demographic-label statistics and session-level data for the viewers. For each viewer, the data management platform 104 determines a statistical probability of a demographic label. In this case, the demographic label is female.

As part of the first iteration, the data management platform 104 verifies whether the determined statistical probability of the demographic label is accurate for 10% of the group of users. To verify accuracy, the data management platform 104 compares the determined statistical probability of the demographic label for 10% of the group to verified demographic labels for that same 10% of the group. The verified demographic labels come from additional demographic-label statistics. The data management platform 104 then trains a logistic regression model to determine coefficients and uses the coefficients in subsequent iterations of the second classification algorithm to determine a statistical probability of the demographic label for the remaining 90% of the group of users. For the accuracy-reach graph 400a, the data management platform 104 ran 25 iterations of the first and second classification algorithm on data for the group of users.

The accuracy-reach graph 400a depicts the results of the data management platform 104 performing the iterations described above. The accuracy-reach graph 400a includes an axis 404 that plots a reach of an advertising campaign to a group of users (e.g., each of the group of users receives an impression of an advertisement while watching a movie). The axis 404 shows the viewers in descending order from highest statistical probability of being female (on the far-left of the axis 404) to least statistical probability of being female (on the far-right of the axis 404).

The accuracy-reach graph 400a also includes an axis 402 that plots an accuracy percentage of the demographic label. As shown in FIG. 4A, the accuracy percentage is based on a mean accuracy percentage determined from the multiple iterations of the first and second classification algorithms on the data described above. The accuracy percentage is represented by accuracy percentage plot 406. As shown by the accuracy percentage plot 406, for example, at 10% reach shown on the axis 404, the data management platform 104 obtains a mean accuracy percentage of approximately 70% by running the first and second classification algorithms. In other words, the data management platform 104 accurately determines 70% of 493 viewers are female, where the 493 viewers represent the 10% of the group that the data management platform 104 identified as most likely to be female. The accuracy-reach graph 400a identifies the accuracy percentage plot 406 with the name "2-Step Classifier."

FIG. 4B likewise illustrates an accuracy-reach graph 400b. The accuracy-reach graph 400b was created using data in which demographic labels were known for 10% of the population. It is common for publisher to have less than 10% of true labels of viewers. The accuracy-reach graph 400b compares an accuracy percentage of the first and second classification algorithms (2-Step Classifier) to conventional classification algorithms, including a Decision Tree Method, Support Vector Machine ("SVM"), and Logistic Regression by itself. Similar to the accuracy-reach graph 400a above, the accuracy-reach graph 400b represents an accuracy percentage of the Decision Tree Method, SVM, and Logistic Regression as an accuracy percentage plot 408, accuracy percentage plot 410, and accuracy percentage plot 412. Accordingly, the accuracy-reach graph 400b shows the accuracy percentage of the first and second classification algorithms (2-Step Classifier), the Decision Tree Method, SVM, and Logistic Regression each determining a demographic label for the group of users based on the same data, including demographic-label statistics and session-level data.

As shown by the accuracy percentage plots 406-412 in FIG. 4B, the first and second classification algorithms (2-Step Classifier) determine a significantly more accurate demographic label for the group of users than the conventional classification algorithms. For example, at 10% reach on the axis 404, the data management platform 104 accurately determines 70% of the 493 viewers are female using the first and second classification algorithms (2-Step Classifier), whereas the data management platform 104 accurately determines 58% of the viewers are female using the next best classification algorithm, SVM. As indicated by the accuracy-reach graph 400b, the combination of the first classification algorithm and second classification algorithm determines a demographic label for a viewer with much more accuracy than conventional classification algorithms. Thus, as shown in FIG. 4B, the first and second classification algorithms (2-Step Classifier) accurately determine demographic labels even with a small percentage of known, verified, or true labels from which to learn.

Figure 5:
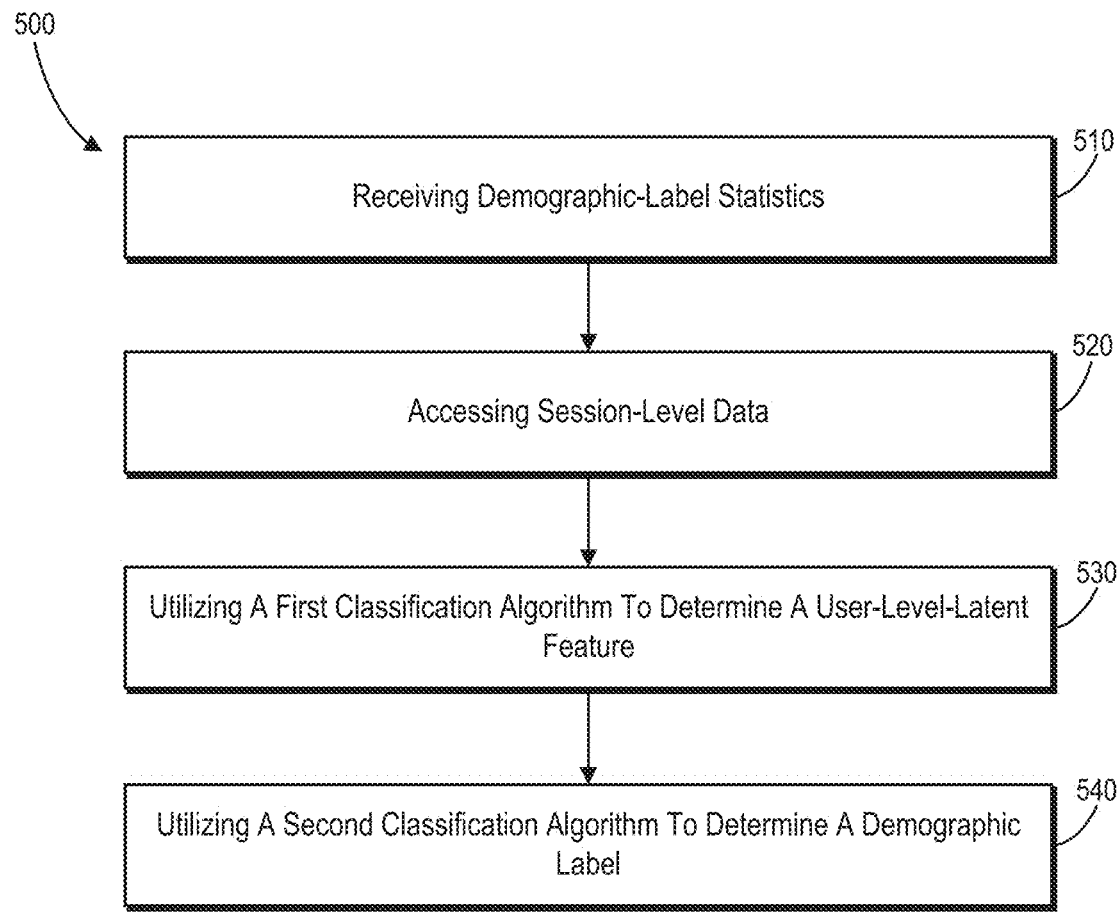
FIG. 5 illustrates a flowchart of a series of acts in a method for determining demographic labels using digital inputs within a predictive model for demographic classification in accordance with one or more embodiments.

Turning now to FIG. 5, this figure illustrates a series of acts in a method 500 for determining demographic labels using digital inputs within a predictive model for demographic classification. As shown in FIG. 5, the method 500 includes an act 510 of receiving demographic-label statistics. For example, the act 510 can include receiving demographic-label statistics associated with digital content items.

As shown in FIG. 5, the method 500 also includes an act 520 of accessing session-level data. In particular, the act 520 can include accessing session-level data associated with the digital content items, wherein the session-level data comprises session-level features for each session in which a user of the plurality of users consumed one of the digital content items.

In one or more embodiments, the plurality of users comprises a subset of users from a larger group of users. Additionally, in some embodiments, accessing the session-level data comprises: extracting the session-level data from an analytics log and aggregating the session-level data within a database.

As shown in FIG. 5, the method 500 also includes an act 530 of utilizing a first classification algorithm to determine a user-level-latent feature. In particular, the act 530 can include utilizing a first classification algorithm to determine a user-level-latent feature for each user of the plurality of users based on the demographic-label statistics and a listing of the digital content items consumed by each user of the plurality of users. In some embodiments, utilizing the first classification algorithm comprises utilizing a Naive Bayes algorithm.

In one or more embodiments, utilizing the first classification algorithm comprises: identifying, from within the demographic-label statistics and for each digital content item within the listing of the digital content items, a collective probability of a possible demographic label for consumers of each of digital content item within the listing of the digital content items; and based on the collective probability of the possible demographic label for the consumers, determining a prior probability of the possible demographic label for each user of the plurality of users, wherein the user-level-latent feature for each user of the plurality of users comprises the determined prior probability of the possible demographic label for each user of the plurality of users. Relatedly, in some embodiments, determining the prior probability of the possible demographic label for each user of the plurality of users comprises determining a product of the collective probability of the possible demographic label for the consumers of each digital content item within the listing of the digital content items.

Additionally, in some embodiments, utilizing the first classification algorithm comprises: assigning one classifier of a plurality of classifiers to each digital content item within the listing of the digital content items; and based on the assigned one classifier of the plurality of classifiers to each digital content item within the listing of the digital content items, generating a count of the digital content items within the listing of the digital content items assigned to each classifier of the plurality of classifiers, wherein the user-level-latent feature for each user of the plurality of users comprises the count of the digital content items within the listing of the digital content items assigned to each classifier of the plurality of classifiers. Relatedly, in some embodiments, assigning one classifier of the plurality of classifiers to each digital content item within the listing of digital content items comprises: determining a threshold to identify and distinguish among the plurality of classifiers; and assigning one classifier of the plurality of classifiers to each digital content item within the listing of digital content items based on the threshold.

As also shown in FIG. 5, the method 500 also includes an act 540 of utilizing a second classification algorithm to determine a demographic label. In particular, the act 540 can include utilizing a second classification algorithm to determine a demographic label for each user of the plurality of users, wherein the second classification algorithm uses as inputs the user-level-latent feature for each user of the plurality of users and the session-level features. In some embodiments, the demographic label comprises a first user characteristic and a second user characteristic.

In one or more embodiments, utilizing the second classification algorithm comprises generating a statistical probability of the demographic label for each user of the plurality of users based on: a number of sessions for each user of the plurality of users; the user-level-latent feature for each user of the plurality of users; session-level features; and coefficients determined by a supervised learning model. Similarly, in some embodiments, utilizing the second classification algorithm further comprises training the supervised learning model based on: the user-level-latent feature for each user of the plurality of users; the session-level features; and additional demographic-label statistics comprising a verified demographic label for each of a subset of the plurality of users. In some such embodiments, the second classification algorithm comprises a logistic regression and the supervised learning model comprises a logistic regression model.

Relatedly, in one or more embodiments, the method 500 further comprises generating a recommendation based on the demographic label for each user of the plurality of users. For example, in some embodiments, the recommendation comprises a suggested digital content item for a portion of the plurality of users, the suggested digital content item comprising a suggested advertisement, an application, an audio content item, a video content item, or a webpage. Additionally, in one or more embodiments, the method 500 further comprises generating a demographic-label report indicating the demographic label for each user of the plurality of users.

As indicated above, in some embodiments, the method 500 includes updating functions. For example, in some embodiments, the method 500 further includes receiving updated demographic-label statistics for the digital content items. In some such embodiments, the method 500 further includes utilizing the first classification algorithm to re-determine the prior probability of the possible demographic label for each user of the plurality of users based on the updated demographic-label statistics. In some embodiments, the method 500 further includes utilizing the second classification algorithm to re-determine the statistical probability of the demographic label for each user of the plurality of users by using as an input for the second classification algorithm the re-determined one or more prior probabilities of the possible demographic label.

Figure 6A:
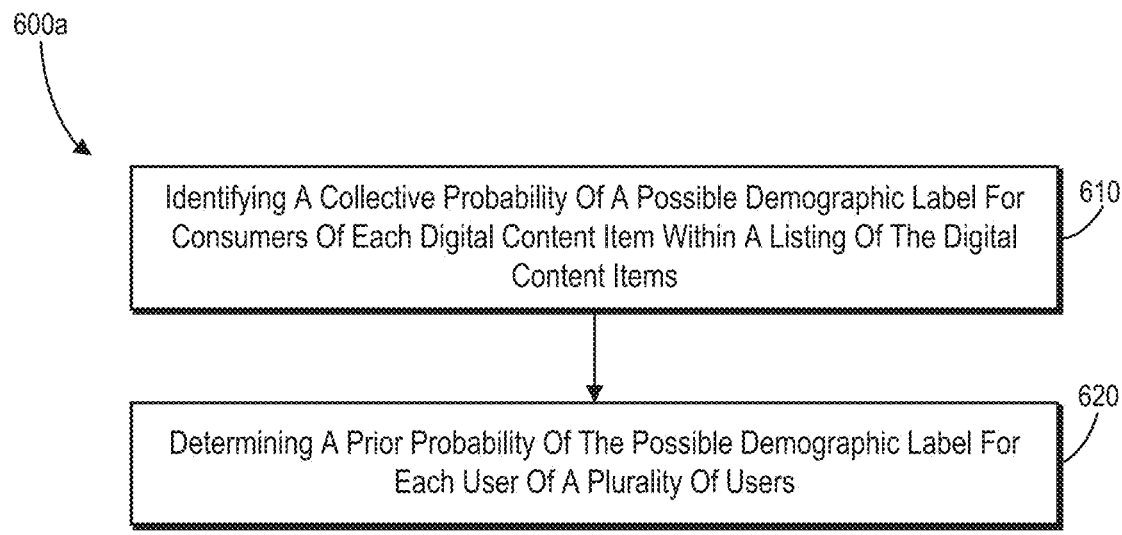
FIGS. 6A and 6B illustrate algorithms comprising a series of acts corresponding to a step for generating one or more user-level-latent features in accordance with one or more embodiments.
Figure 6B:
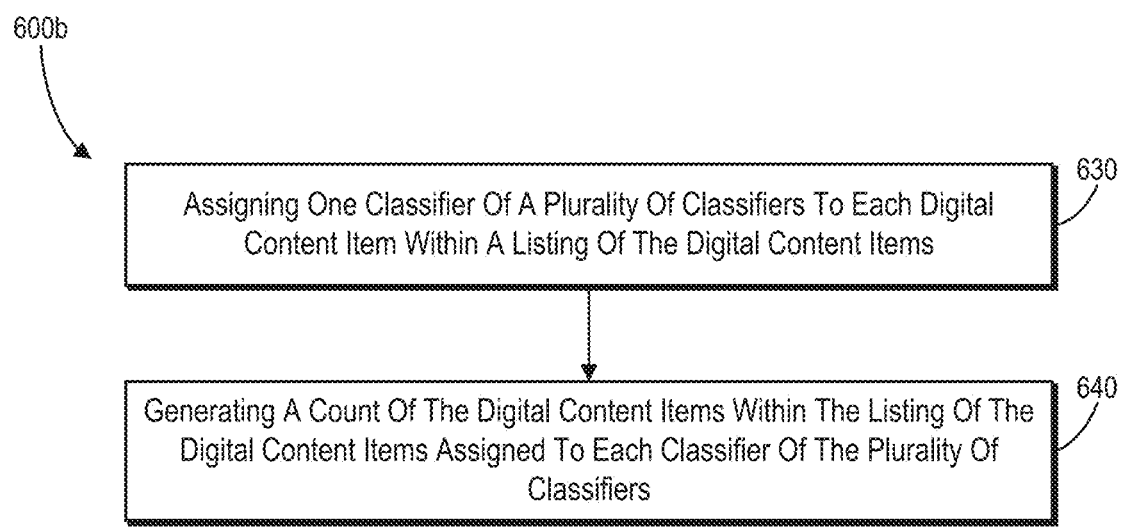

In some embodiments, methods disclosed herein include one or more steps for generating the user-level-latent feature. For example, in some such embodiments, the method includes a step for generating a user-level-latent feature for each user of the plurality of users based on the demographic-label statistics and a listing of the digital content items consumed by each user of the plurality of users. FIGS. 6A and 6B illustrate algorithms that each separately (or together) comprise acts that correspond to the step for generating one or more user-level-latent features.

Specifically, FIG. 6A illustrates an algorithm 600a and FIG. 6B illustrates an algorithm 600b. Each of algorithms 600a and 600b correspond to one embodiment of performing a step for generating a user-level-latent feature. While FIGS. 6A and 6B illustrate algorithms according to one embodiment, alternative embodiments may omit, add to, reorder, and/or modify any of the acts shown in FIG. 6A or 6B. Further, the data management platform 104, the client device 112d, or a combination of both, may perform one or more of the acts of the algorithms 600a or 600b.

As shown in FIG. 6A, the algorithm 600a includes an act 610 of identifying a collective probability of a possible demographic label for consumers of each digital content item within the listing of the digital content items. For example, in some embodiments, the act 610 includes identifying, from within the demographic-label statistics and for each digital content item within the listing of the digital content items, a collective probability of a possible demographic label for consumers of each digital content item within the listing of the digital content items.

As also shown in FIG. 6A, the algorithm 600a includes an act 620 of determining a prior probability of the possible demographic label for each user of a plurality of users. In particular, the act 620 may include determining a prior probability of the possible demographic label for each user of the plurality of users, wherein the user-level-latent feature for each user of the plurality of users comprises the determined prior probability of the possible demographic label for each user of the plurality of users.

In some embodiments, the act 620 includes, based on the collective probability of the possible demographic label for the consumers, determining a prior probability of the possible demographic label for each user of the plurality of users, wherein the user-level-latent feature for each user of the plurality of users comprises the determined prior probability of the possible demographic label for each user of the plurality of users. Moreover, in one or more embodiments, determining the prior probability of the possible demographic label for each user of the plurality of users comprises determining a product of the collective probability of the possible demographic label for the consumers of each digital content item within the listing of the digital content items.

Relatedly, in one embodiment of the algorithm 600a, the data management platform 104 performs the acts 610 and 620 by using function (1) or variations of function (1), as described above. Moreover, in some embodiments, the algorithm 600a includes any of the acts or details described above with reference to the Naive Bayes algorithm.

As shown in FIG. 6B, the algorithm 600b includes an act 630 of assigning one classifier of a plurality of classifiers to each digital content item within the listing of the digital content items. In some embodiments, assigning one classifier of the plurality of classifiers to each digital content item within the listing of digital content items comprises: determining a threshold to identify and distinguish among the plurality of classifiers; and assigning one classifier of the plurality of classifiers to each digital content item within the listing of digital content items based on the threshold.

As also shown in FIG. 6B, the algorithm 600b includes an act 640 of generating a count of the digital content items within the listing of the digital content items assigned to each classifier of the plurality of classifiers. For example, in some embodiments, the act 640 includes, based on the assigned one classifier of the plurality of classifiers to each digital content item within the listing of the digital content items, generating a count of the digital content items within the listing of the digital content items assigned to each classifier of the plurality of classifiers, wherein the user-level-latent feature for each user of the plurality of users comprises the count of the digital content items within the listing of the digital content items assigned to each classifier of the plurality of classifiers.

Relatedly, in one or more embodiments, the algorithm 600b includes any of the acts or details described above with reference to the frequency of digital content items consumed by users of a particular demographic label, including the counts of digital content items.

Figure 7:
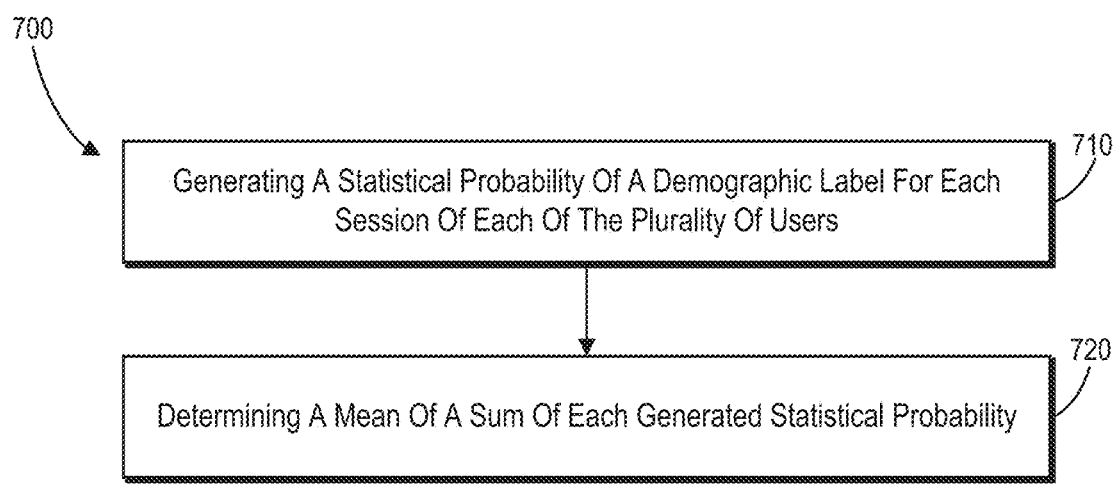
FIG. 7 illustrates an algorithm comprising a series of acts corresponding to a step for determining a demographic label in accordance with one or more embodiments.

In some embodiments, the methods include one or more steps for determining a demographic label. For example, in some such embodiments, the method includes a step for determining a demographic label for each user of the plurality of users based on the user-level-latent feature for each user of the plurality of users and the session-level features. FIG. 7 illustrates an algorithm that comprises acts that correspond to the step for determining a demographic label.

Specifically, FIG. 7 illustrates an algorithm 700 that corresponds to one embodiment of performing a step for determining a demographic label. While FIG. 7 illustrates an algorithm according to one embodiment, alternative embodiments may omit, add to, reorder, and/or modify any of the acts shown in FIG. 7. Further, the data management platform 104, the client device 112d, or a combination of both, may perform one or more of the acts of the algorithm 700.

As shown in FIG. 7, the algorithm 700 includes an act 710 of generating a statistical probability of a demographic label for each session of each of a plurality of users. For example, the act 710 can include generating a statistical probability of the demographic label for each user of the plurality of users based on: a number of sessions for each user of the plurality of users; the user-level-latent feature for each user of the plurality of users; session-level features; and coefficients determined by a supervised learning model. In one or more embodiments, the number of sessions for each of user the plurality of users, the user-level-latent feature for each user of the plurality of users, the session-level features, and the coefficients determined by the supervised learning model are inputs in a supervised learning algorithm.

As also shown in FIG. 7, the algorithm 700 includes an act 720 of determining a mean of a sum of each generated statistical probability. For example, in some embodiments, the act 720 includes determining a mean of a sum of each generated statistical probability of the demographic label for each user of the plurality of users, where a supervised learning algorithm used the following inputs: the number of sessions for each user of the plurality of users, the user-level-latent feature for each user of the plurality of users, the session-level features, and the coefficients determined by the supervised learning model are inputs in a supervised learning algorithm.

Relatedly, in one embodiment of the algorithm 700, the supervised learning model comprises a logistic regression model and the supervised learning algorithm comprises a logistic regression. Moreover, in some embodiments, the data management platform 104 performs the acts 710 and 720 by using function (2) or variations of function (2), as described above. Additionally, in some embodiments, the algorithm 700 includes any of the acts or details described above with reference to supervised learning models or logistic regression.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), a web service, Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 8:
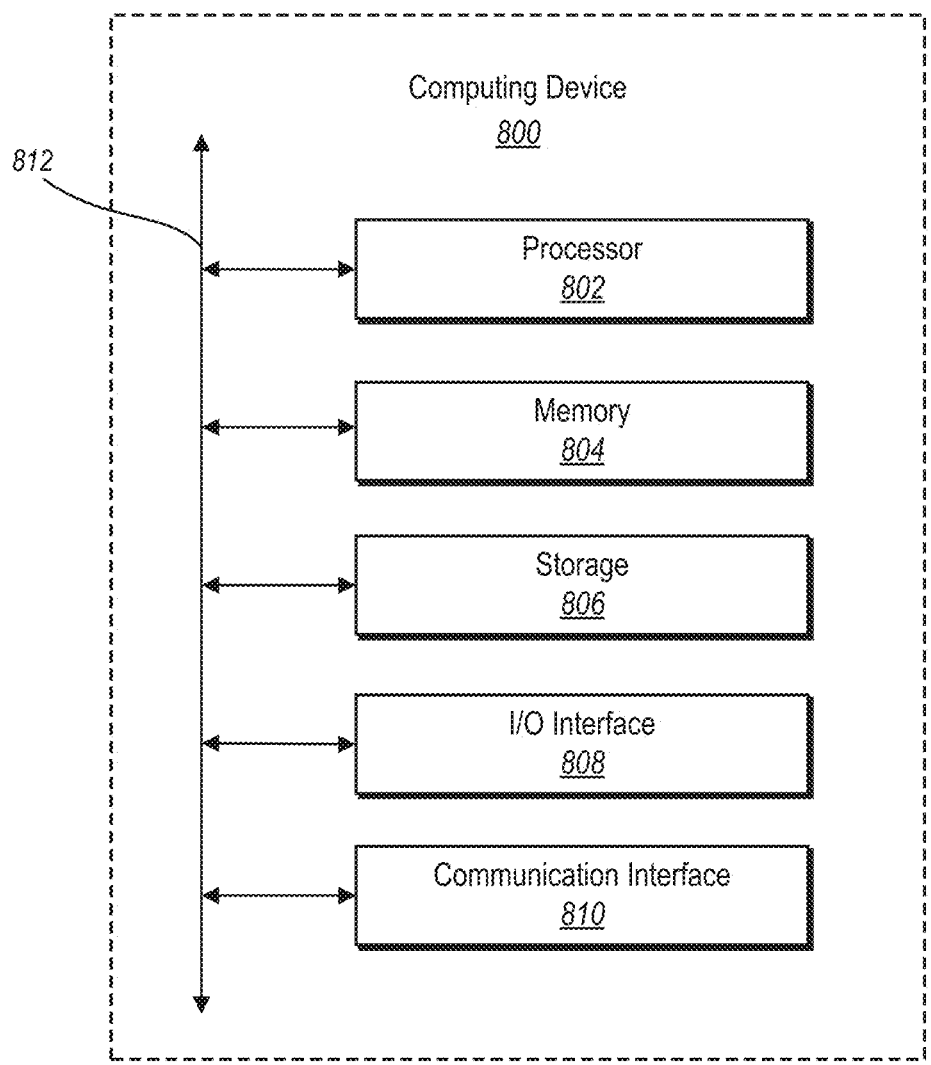
FIG. 8 illustrates a block diagram of a computing device in accordance with one or more embodiments.

FIG. 8 illustrates a block diagram of exemplary computing device 800 that may be configured to perform one or more of the processes described above. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions for digitizing real-world objects, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions related to object digitizing processes (e.g., digital scans, digital models). For example, the memory 804 can store the analytics database 108.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment, a computer-implemented method for determining demographic labels using digital inputs within a predictive model for demographic classification comprising:

receiving demographic-label statistics associated with digital content items;

accessing session-level data associated with the digital content items, wherein the session-level data comprises session-level features for sessions in which a user of a plurality of users consumed one or more of the digital content items;

utilizing a first classification algorithm to determine a user-level-latent feature for the user by analyzing subsets of the demographic-label statistics particular to different digital content items consumed by the user and a listing of the different digital content items consumed by the user;

generating a first coefficient learned by a supervised learning model for user-level-latent features processed by the supervised learning model;

generating a second coefficient learned by the supervised learning model for session-level features processed by the supervised learning model; and utilizing a second classification algorithm to determine a demographic label for the user by analyzing the user-level-latent feature for the user, the session-level features, the first coefficient learned by the supervised learning model, and the second coefficient learned by the supervised learning model.

2. The computer-implemented method of claim 1, wherein utilizing the first classification algorithm comprises:
identifying, from within the demographic-label statistics and for each digital content item within the listing of the different digital content items, a collective probability of a possible demographic label for consumers of each digital content item within the listing of the different digital content items; and
based on the collective probability of the possible demographic label for the consumers, determining a prior probability of the possible demographic label for the user, wherein the user-level-latent feature for the user comprises the prior probability of the possible demographic label for the user.

3. The computer-implemented method of claim 2, wherein determining the prior probability of the possible demographic label for the user comprises determining a product of the collective probability of the possible demographic label for the consumers of each digital content item within the listing of the different digital content items.

4. The computer-implemented method of claim 1, wherein utilizing the first classification algorithm comprises:
assigning one classifier of a plurality of classifiers to each digital content item within the listing of the different digital content items; and
based on the assigned one classifier of the plurality of classifiers to each digital content item within the listing of the different digital content items, generating a count of the different digital content items within the listing of the different digital content items assigned to each classifier of the plurality of classifiers, wherein the user-level-latent feature for the user comprises the count of the different digital content items within the listing of the different digital content items assigned to each classifier of the plurality of classifiers.

5. The computer-implemented method of claim 4, wherein assigning one classifier of the plurality of classifiers to each digital content item within the listing of the different digital content items comprises:
determining a threshold to identify and distinguish among the plurality of classifiers; and
assigning one classifier of the plurality of classifiers to each digital content item within the listing of the different digital content items based on the threshold.

6. The computer-implemented method of claim 1, wherein utilizing the first classification algorithm comprises utilizing a Naive Bayes algorithm.

7. The computer-implemented method of claim 1, wherein utilizing the second classification algorithm comprises generating a statistical probability of the demographic label for the user based on:
a number of sessions for the user;
the user-level-latent feature for the user;
the session-level features;
the first coefficient learned by the supervised learning model; and
the second coefficient learned by the supervised learning model.

8. The computer-implemented method of claim 7, wherein utilizing the second classification algorithm further comprises training the supervised learning model based on:
a user-level-latent feature for each verified user of a plurality of verified users corresponding to verified demographic labels;
session-level features in which a verified user of the plurality of verified users consumed one or more training digital content items; and
additional demographic-label statistics comprising the verified demographic label for each verified user of the plurality of verified users.

9. The computer-implemented method of claim 7, wherein the second classification algorithm comprises a logistic regression and the supervised learning model comprises a logistic regression model.

10. A non-transitory computer readable storage medium storing instructions thereon that, when executed by at least one processor, cause a computing device to:
receive demographic-label statistics associated with digital content items;
access session-level data associated with the digital content items, wherein the session-level data comprises session-level features for sessions in which a user of a plurality of users consumed one or more of the digital content items;
utilize a first classification algorithm to determine a user-level-latent feature for the user by analyzing subsets of the demographic-label statistics particular to different digital content items consumed by the user and a listing of the different digital content items consumed by the user;
generate a first coefficient learned by a supervised learning model for user-level-latent features processed by the supervised learning model;
generate a second coefficient learned by the supervised learning model for session-level features processed by the supervised learning model; and
utilize a second classification algorithm to determine a demographic label for the user by analyzing the user-level-latent feature for the user, the session-level features, the first coefficient learned by the supervised learning model, and the second coefficient learned by the supervised learning model.

11. The non-transitory computer readable storage medium of claim 10, wherein the plurality of users comprises a subset of users from a larger group of users.

12. The non-transitory computer readable storage medium of claim 10, further comprising instructions that, when executed by the at least one processor, cause the computing device to generate a recommendation based on the demographic label for the user.

13. The non-transitory computer readable storage medium of claim 12, wherein the recommendation comprises a suggested digital content item for the user, the suggested digital content item comprising a suggested advertisement, an application, an audio content item, a video content item, or a webpage.

14. The non-transitory computer readable storage medium of claim 10, further comprising instructions that, when executed by the at least one processor, cause the computing device to generate a demographic-label report indicating the demographic label for the user.

15. The non-transitory computer readable storage medium of claim 10, further comprising instructions that, when executed by the at least one processor, cause the computing device to access the session-level data by:
extracting the session-level data from an analytics log; and
aggregating the session-level data within a database.

16. A system for determining demographic labels using digital inputs within a predictive model for demographic classification comprising:

memory comprising demographic-label statistics for digital content items; and a server computing device comprising instructions thereon that, when executed by the server computing device, cause the system to:

access the demographic-label statistics for the digital content items;

access session-level data concerning the digital content items, wherein the session-level data comprises session-level features for sessions in which a user of a plurality of users consumed one or more of the digital content items;

utilize a first classification algorithm to determine a prior probability of a possible demographic label for the user by identifying, from within the demographic-label statistics and for each digital content item consumed by the user, a collective probability of the possible demographic label for consumers of each digital content item consumed by the user and determining a product of each collective probability of the possible demographic label;

generate a first coefficient learned by a supervised learning model for prior probabilities of possible demographic labels processed by the supervised learning model;

generate a second coefficient learned by the supervised learning model for session-level features processed by the supervised learning model; and utilize a second classification algorithm to determine a statistical probability of a demographic label for the user by analyzing a number of sessions for the user, the prior probability of the possible demographic label for the user, the session-level features, the first coefficient learned by the supervised learning model, and the second coefficient learned by the supervised learning model.

17. The system of claim 16, further comprising instructions that, when executed by the server computing device, cause the system to receive updated demographic-label statistics for the digital content items.

18. The system of claim 17, further comprising instructions that, when executed by the server computing device, cause the system to utilize the first classification algorithm to re-determine the prior probability of the possible demographic label for the user based on the updated demographic-label statistics.

19. The system of claim 18, further comprising instructions that, when executed by the server computing device, cause the system to utilize the second classification algorithm to re-determine the statistical probability of the demographic label for the user by using as an input for the second classification algorithm the re-determined prior probability of the possible demographic label for the user.

20. The system of claim 16, wherein the demographic label comprises a first user characteristic and a second user characteristic.

* * * * *